United States Patent
Monden et al.

(10) Patent No.: US 12,126,174 B2
(45) Date of Patent: Oct. 22, 2024

(54) ENERGY STORAGE SYSTEM AND CONTROL METHOD

(71) Applicants: KABUSHIKI KAISHA TOSHIBA, Tokyo (JP); TOSHIBA ENERGY SYSTEMS & SOLUTIONS CORPORATION, Kawasaki Kanagawa (JP)

(72) Inventors: Yukitaka Monden, Kawasaki Kanagawa (JP); Shuji Yamazaki, Yokohama Kanagawa (JP); Takenori Kobayashi, Tokyo (JP)

(73) Assignees: Kabushiki Kaisha Toshiba, Tokyo (JP); Toshiba Energy Systems & Solutions Corporation, Kawasaki (JP)

( * ) Notice: Subject to any disclaimer, the term of this patent is extended or adjusted under 35 U.S.C. 154(b) by 0 days.

(21) Appl. No.: 17/769,319

(22) PCT Filed: Oct. 15, 2019

(86) PCT No.: PCT/JP2019/040524
§ 371 (c)(1),
(2) Date: Apr. 14, 2022

(87) PCT Pub. No.: WO2021/074976
PCT Pub. Date: Apr. 22, 2021

(65) Prior Publication Data
US 2024/0128755 A1 Apr. 18, 2024

(51) Int. Cl.
*H02J 3/32* (2006.01)
*H02J 7/00* (2006.01)
*H02J 7/34* (2006.01)

(52) U.S. Cl.
CPC ............ *H02J 3/32* (2013.01); *H02J 7/00712* (2020.01); *H02J 7/34* (2013.01)

(58) Field of Classification Search
CPC ............ H02J 3/32; H02J 7/00712; H02J 7/34
(Continued)

(56) References Cited

U.S. PATENT DOCUMENTS

| 2018/0183239 A1 | 6/2018 | Shibata et al. |
| 2021/0356527 A1 | 11/2021 | Monden et al. |

FOREIGN PATENT DOCUMENTS

| JP | 2016-152718 A | 8/2016 |
| JP | 2017 46440 A | 3/2017 |

(Continued)

*Primary Examiner* — Rexford N Barnie
*Assistant Examiner* — Swarna N Chowdhuri
(74) *Attorney, Agent, or Firm* — Finnegan, Henderson, Farabow, Garrett & Dunner, LLP

(57) ABSTRACT

An energy storage system according to an embodiment includes first and second power storage devices and performs charge/discharge control for the power storage devices based on a charge/discharge command value. The first power storage device performs discharging for one or more devices as destination via a power line or performs charging of power supplied from one or more devices as source via the power line, and the second power storage device performs charging and discharging for the first power storage device. The energy storage system also includes a control system that controls charge/discharge power of the second power storage device so that a power storage rate of the first power storage device falls within a predetermined power storage rate range and controls charge/discharge power of the first power storage device based on charge/discharge power corresponding to the charge/discharge command value and the charge/discharge power of the second power storage device.

5 Claims, 2 Drawing Sheets

(58) Field of Classification Search
USPC .......................................................... 307/48
See application file for complete search history.

(56) References Cited

FOREIGN PATENT DOCUMENTS

| | | | | | |
|---|---|---|---|---|---|
| JP | 2017046440 | A | * | 3/2017 | ................ H02J 3/32 |
| JP | 2017189045 | A | * | 10/2017 | |
| WO | WO 2015/198630 | A1 | | 12/2015 | |
| WO | WO 2019-186659 | A1 | | 10/2019 | |

* cited by examiner

ENERGY STORAGE SYSTEM AND CONTROL METHOD

CROSS-REFERENCE TO RELATED APPLICATIONS

This application is national stage application of International Application No. PCT/JP2019/040524, filed Oct. 15, 2019, which designates the United States, incorporated herein by reference.

FIELD

Embodiments of the present invention relate to an energy storage system and a control method.

BACKGROUND

Conventionally, in an energy storage system that includes a first power storage device having first battery characteristics and capable of charging and discharging with respect to a load and a second power storage device having second battery characteristics different from the first battery characteristics and capable of charging and discharging with respect to the load, it is proposed to calculate a power sharing rate of the first power storage device on the basis of the obtained charging rate of the second power storage device, and to generate a power command value. (e.g., see Patent Literature 1).

As described above, in the aforementioned conventional energy storage system, the power sharing rate of the first power storage device is determined from the charging rate of the second power storage device. For this reason, for example, in a discharge operation in which the load consumes power, when the charging rate of the second power storage device decreases, the discharge power of the first power storage device is increased and the discharge power of the second power storage device is reduced to continue the running.

DETAILED DESCRIPTION

An energy storage system according to an embodiment includes a first power storage device and a second power storage device and is configured to perform charge/discharge control for the first power storage device and the second power storage device based on a charge/discharge command value. The first power storage device is configured to perform discharging for one or more devices serving as a power supply destination via a power line or perform charging to store power supplied from one or more devices serving as a power supply source via the power line, and the second power storage device is connected to the first power storage device via the power line and configured to perform charging and discharging for the first power storage device. The energy storage system includes a control system configured to: control charge/discharge power of the second power storage device so that a power storage rate of the first power storage device falls within a predetermined power storage rate range; and control charge/discharge power of the first power storage device based on charge/discharge power corresponding to the charge/discharge command value and the charge/discharge power of the second power storage device.

The following is an explanation of preferred embodiments with reference to the drawings.

[1] First Embodiment

Figure 1:
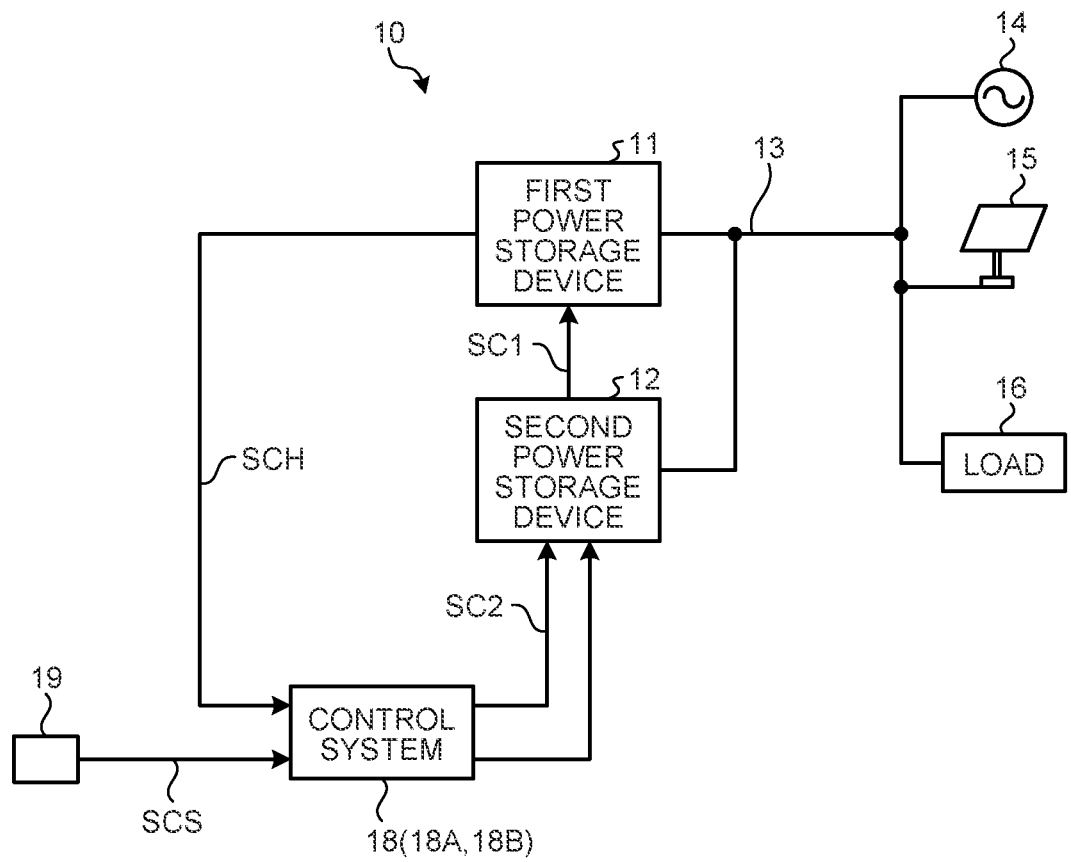
FIG. 1 is a schematic block diagram of an energy storage system according to a first embodiment.

FIG. 1 is a schematic block diagram of an energy storage system according to a first embodiment.

An energy storage system 10 includes a first power storage device 11 capable of charging and discharging during a period of first time, a second power storage device 12 having different charging and discharging characteristics from those of the first power storage device and capable of charging and discharging during a period of second time longer than the first time, a commercial power source 14 supplying commercial power via a power line 13, a solar power generation device 15 generating electricity by photoelectric conversion of sunlight, a load 16 supplied with power, a control system 18 controlling the whole energy storage system and outputting a first charge/discharge control signal SC1 and a second charge/discharge control signal SC2 on the basis of a charging rate signal SCH to control charging and discharging of the first power storage device 11 and the second power storage device 12, and a host control system 19 outputting a charge/discharge command signal SCS and controlling the control system 18.

In the above configuration, the first power storage device 11 is connected to the second power storage device 12 via the power line 13.

In the configuration, the power line 13 is also connected to the commercial power source 14, the solar power generation device 15, and the load 16. In this manner, the first power storage device 11 is configured to be charged with surplus power and discharge required power to absorb generated power fluctuations as renewable energy supplied by the solar power generation device 15 and power demand fluctuations of the load 16.

On the other hand, in the first embodiment, the second power storage device 12 does not directly perform charging and discharging with the solar power generation device 15 or the load 16, but is aimed at adjusting the remaining stored power (remaining energy) of the first power storage device 11.

For this reason, the control system 18 controls the second power storage device 12 by the second charge/discharge control signal SC2 for the above purpose.

Figure 2:
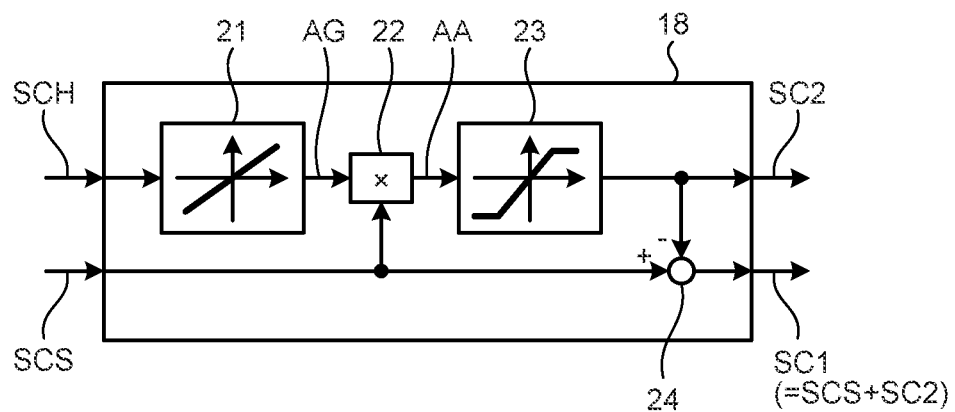
FIG. 2 is a schematic block diagram of a control system according to the first embodiment.

FIG. 2 is a schematic block diagram of the control system.

The control system 18 includes, when it is broadly divided, a gain circuit 21, an integration circuit 22, a limit circuit 23, and an addition circuit 24.

The gain circuit 21 outputs an adjustment gain value AG according to a predetermined charging rate (e.g., 50%) preset for the first power storage device 11.

In other words, the gain circuit 21 outputs an adjustment gain value AG based on the charging rate signal SCH input from the first power storage device 11 to perform control so that the charging rate of the first power storage device 11 becomes the predetermined charging rate.

In the above example, the adjustment gain value AG is set such that the second power storage device 12 is charged when the charging rate of the first power storage device 11 exceeds 50%, and such that the second power storage device 12 is discharged to charge the first power storage device 11 when the charging rate of the first power storage device 11 falls below 50%. In this manner, the running is performed to maintain the charging rate at 50% being the predetermined charging rate of the first power storage device 11.

For this reason, the gain circuit 21 sets and outputs the adjustment gain value AG on the basis of a difference between the target predetermined charging rate (50% in the example above) and the charging rate of the first power storage device 11 corresponding to the charging rate signal SCH.

The integration circuit 22 generates and outputs an adjustment amount signal AA corresponding to the adjustment amount of the charge/discharge command signal SCS by multiplying the adjustment gain value AG by the charge/discharge command signal SCS.

The limit circuit 23 is a circuit limiting the adjustment amount signal AA and outputting the signal AA as the second charge/discharge control signal SC2 to the second power storage device 12 such that the absolute value of the adjustment amount indicated by the adjustment amount signal AA does not become too large. In other words, the limit circuit 23 is a circuit limiting the adjustment amount indicated by the adjustment amount signal to a value falling within a range from a predetermined maximum value to a predetermined minimum value.

The addition circuit 24 subtracts the second charge/discharge control signal SC2 from the charge/discharge command signal SCS and outputs it as the first charge/discharge control signal SC1 to the first power storage device 11.

The operation of the first embodiment will be described hereinafter.

When the charging rate signal SCH is input from the first power storage device 11, the gain circuit 21 of the control system 18 outputs the adjustment gain value AG to the integration circuit 22 to perform control so that the charging rate of the first power storage device 11 becomes the predetermined charging rate on the basis of the charging rate signal SCH.

In this case, for example, when the predetermined charging rate is 50%, the adjustment gain value AG is 0 (i.e., no charging or discharging is performed) in the case where the charging rate signal SCH indicates a charging rate of 50%.

When the charging rate signal SCH indicates a charging rate exceeding 50%, the gain circuit 21 sets the adjustment gain value AG such that the excessive charge power in the storage power of the first power storage device 11 is set as the charge power (storage power) of the second power storage device 12. For example, when the charging rate signal SCH corresponds to a charging rate of 52%, the gain circuit 21 sets the adjustment gain value AG such that storage power for 2% by which the charging rate exceeds the predetermined charging rate of 50% is set as the charge power (storage power) of the second power storage device 12, and outputs the adjustment gain value AG to the integration circuit 22.

On the other hand, when the charging rate signal SCH indicates a charging rate less than 50%, the gain circuit 21 sets the adjustment gain value for the insufficient charge power in the storage power of the first power storage device 11. For example, when the charging rate signal SCH corresponds to 47%, the gain circuit 21 sets the adjustment gain value AG such that storage power for 3% by which the charging rate is lower than the predetermined charging rate of 50% is set as the discharge power of the second power storage device 12, and outputs the adjustment gain value AG to the integration circuit 22.

Thereafter, the integration circuit 22 multiplies the adjustment gain value AG by the charge/discharge command signal SCS to generate an adjustment amount signal AA corresponding to the adjustment amount of the charge/discharge command signal SCS, and outputs the adjustment amount signal AA to the limit circuit 23.

The limit circuit 23 limits the adjustment amount signal AA such that the absolute value of the adjustment amount indicated by the adjustment amount signal AA does not become too large, that is, such that the discharge or charge power of the second power storage device 12 falls within a predetermined range for the charge/discharge rating of the second power storage device 12. The limit circuit 23 outputs the adjustment amount signal AA as the second charge/discharge control signal SC2 to the second power storage device 12 and the addition circuit 24.

As a result, the rated charge/discharge capacity of the second power storage device 12 can be set to the minimum required, and the charge/discharge input/output rating can be reduced.

Thereafter, the addition circuit 24 subtracts the second charge/discharge control signal SC2 from the charge/discharge command signal SCS and outputs it as the first charge/discharge control signal SC1 to the first power storage device 11.

The first power storage device 11 charges or discharges on the basis of the first charge/discharge control signal SC1, and the second power storage device 12 charges or discharges on the basis of the second charge/discharge control signal SC2, with the first power storage device 11 used as the charge/discharge target.

As a result, according to the first embodiment, the charge/discharge power of the second power storage device is controlled such that the power storage rate of the first power storage device 11 is set to the predetermined power storage rate (range), and the charge/discharge power of the first power storage device 11 is controlled on the basis of the charge/discharge power corresponding to the charge/discharge command value corresponding to the charge/discharge command signal SCS and the charge/discharge power of the second power storage device. By controlling the charge/discharge power, the charge/discharge power of the second power storage device 12 can be limited within the limit range defined by the limit circuit 23 while maintaining the charging rate of the first power storage device 11 around the predetermined charging rate. This structure reduces the charge/discharge input/output rating of the second power storage device 12.

[2] Second Embodiment

The following is an explanation of a second embodiment.

Figure 3:
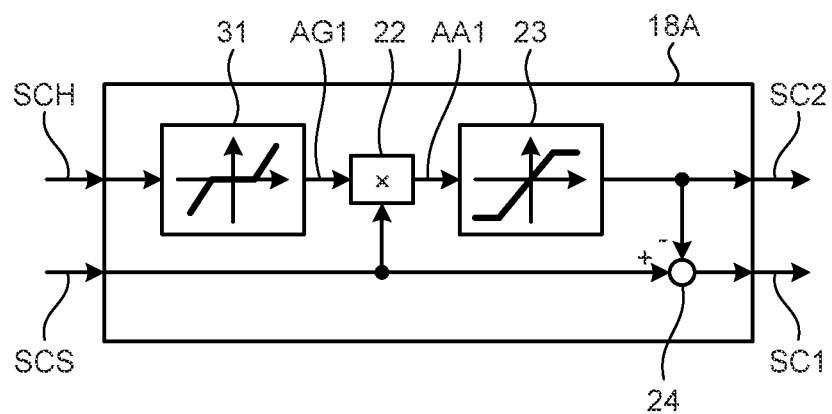
FIG. 3 is a schematic block diagram of a control system according to a second embodiment.

FIG. 3 is a schematic block diagram of the control system according to the second embodiment.

A control system 18A according to the second embodiment differs from the control system 18 according to the first embodiment in that, instead of the gain circuit 21, it is equipped with a gain circuit 31 performing control such that charging and discharging of the second power storage device 12 are not performed in the predetermined charging rate range around the predetermined charging rate.

For example, when the predetermined charging rate of the first power storage device 11 is set to 50%, the gain circuit 31 sets an adjustment gain value AG1 such that the second power storage device 12 is charged when the charging rate of the first power storage device 11 exceeds 55%, and such that the second power storage device 12 is discharged to charge the first power storage device 11 when the charging rate of the first power storage device 11 falls below 45%. In this manner, the running is performed to maintain the charging rate at a value around 50% being the predetermined charging rate of the first power storage device 11.

The operation of the second embodiment will be described hereinafter.

When the charging rate signal SCH is input from the first power storage device 11, the gain circuit 31 of the control system 18A outputs the adjustment gain value AG1 to the integration circuit 22 to perform control so that the charging rate of the first power storage device 11 becomes the predetermined charging rate on the basis of the charging rate signal SCH.

In this case, for example, when the predetermined charging rate is 50% and the charging rate signal SCH is located within a range of 45 to 55% charging rate, the adjustment gain value AG1 is set to 0 (i.e., no charging or discharging is performed).

When the charging rate signal SCH indicates a charging rate exceeding 55%, the gain circuit 31 sets the adjustment gain value AG such that the excessive charge power in the storage power of the first power storage device 11 is set as the charge power (storage power) of the second power storage device 12. For example, when the charging rate signal SCH corresponds to a charging rate of 58%, the gain circuit 31 sets the adjustment gain value AG1 such that storage power for 3% by which the charging rate exceeds the predetermined charging rate of 55% is set as the charge power (storage power) of the second power storage device 12, and outputs the adjustment gain value AG1 to the integration circuit 22.

On the other hand, when the charging rate signal SCH indicates a charging rate less than 45%, the gain circuit 31 sets the adjustment gain value AG1 for the insufficient charge power in the storage power of the first power storage device 11. For example, when the charging rate signal SCH corresponds to the charging rate of 41%, the gain circuit 31 sets the adjustment gain value AG1 such that storage power for 4% by which the charging rate is lower than the predetermined charging rate of 45% is set as the discharge power of the second power storage device 12, and outputs the adjustment gain value AG1 to the integration circuit 22.

Thereafter, the integration circuit 22 multiplies the adjustment gain value AG1 by the charge/discharge command signal SCS to generate an adjustment amount signal AA corresponding to the adjustment amount of the charge/discharge command signal SCS, and outputs the adjustment amount signal AA to the limit circuit 23.

The limit circuit 23 limits the adjustment amount signal AA1 such that the absolute value of the adjustment amount indicated by the adjustment amount signal AA1 does not become too large, that is, such that the discharge power or charge power of the second power storage device 12 falls within a predetermined range for the charge/discharge rating of the second power storage device 12. The limit circuit 23 outputs the adjustment amount signal AA1 as the second charge/discharge control signal SC2 to the second power storage device 12 and the addition circuit 24.

As a result, according to the second embodiment, the conditions under which charging and discharging is required can be relaxed, the rated charge/discharge capacity of the second power storage device 12 can be set to the minimum required, and the charge/discharge input/output rating can be further reduced, compared to the case of the first embodiment.

Thereafter, the addition circuit 24 subtracts the second charge/discharge control signal SC2 from the charge/discharge command signal SCS and outputs it as the first charge/discharge control signal SC1 to the first power storage device 11.

The first power storage device 11 charges or discharges on the basis of the first charge/discharge control signal SC1, and the second power storage device 12 charges or discharges on the basis of the second charge/discharge control signal SC2, with the first power storage device 11 used as the charge/discharge target.

As a result, according to the second embodiment, the charge/discharge power of the second power storage device 12 can be limited within the limit range defined by the limit circuit 23 while maintaining the charging rate of the first power storage device 11 around the predetermined charging rate range. This structure further can reduce the charge/discharge input/output rating of the second power storage device 12.

In addition, when the charging rate of the first power storage device 11 falls within the predetermined charging rate range, the operation of the second power storage device 12 can be effectively stopped, resulting in lower power consumption.

[3] Third Embodiment

The following is an explanation of a third embodiment.

Figure 4:
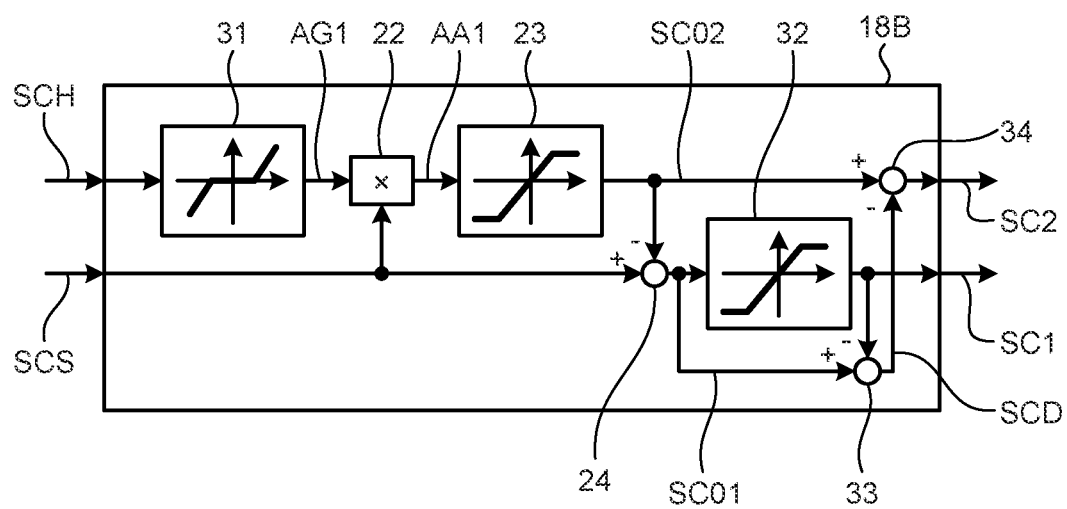
FIG. 4 is a schematic block diagram of a control system according to a third embodiment.

FIG. 4 is a schematic block diagram of a control system according to the third embodiment.

A control system 18B according to the third embodiment differs from the control system 18A according to the second embodiment in that the control system 18B includes a second limit circuit 32, a second addition circuit 33, and a third addition circuit 34, at the subsequent stage of the addition circuit 24. The second limit circuit 32 receives a first charge/discharge control signal SC01 identical to the first charge/discharge control signal SC1 of the second embodiment, limits the first charge/discharge control signal SC01 such that the absolute value of the charge/discharge power corresponding to the first charge/discharge control signal SC01 does not become too large, and outputs the first charge/discharge control signal SC0 as the first charge/discharge control signal SC1 to the first power storage device 11. The second addition circuit 33 calculates the difference between the first charge/discharge control signal SC1 and the first charge/discharge control signal SC0 and outputs a difference signal SCD. The third addition circuit 34 receives a second charge/discharge control signal SC02 identical to the second charge/discharge control signal SC02 according to the second embodiment output from the limit circuit 23, calculates the difference between the second charge/discharge control signal SC02 and the difference signal SCD, and outputs the difference as the second charge/discharge control signal SC2 to the second power storage device 12.

The operation of the third embodiment will be described hereinafter.

When the charging rate signal SCH is input from the first power storage device 11, the gain circuit 31 of the control system 18B outputs the adjustment gain value AG1 to the integration circuit 22 to perform control so that the charging rate of the first power storage device 11 becomes the predetermined charging rate on the basis of the charging rate signal SCH.

In this case, for example, when the predetermined charging rate is 50% and the charging rate signal SCH is located within a range of 45 to 55% charging rate, the adjustment gain value AG1 is set to 0 (i.e., no charging or discharging is performed).

When the charging rate signal SCH indicates a charging rate exceeding 55%, the gain circuit 31 sets the adjustment gain value AG1 such that the excessive charged power in the storage power of the first power storage device 11 is set as the charge power (storage power) of the second power storage device 12. For example, when the charging rate signal SCH corresponds to a charging rate of 58%, the gain circuit 31 sets the adjustment gain value AG1 such that storage power for 3% by which the charging rate exceeds the predetermined charging rate of 55% is set as the charge power (storage power) of the second power storage device 12, and outputs the adjustment gain value AG1 to the integration circuit 22.

On the other hand, when the charging rate signal SCH indicates a charging rate of less than 45%, the gain circuit 31 sets the adjustment gain value AG1 for the insufficient charge power in the storage power of the first power storage device 11. For example, when the charging rate signal SCH corresponds to a charging rate of 41%, the gain circuit 31 sets the adjustment gain value AG1 such that storage power for 4% by which the charging rate is lower than the predetermined charging rate of 45% is set as the discharge power of the second power storage device 12, and outputs the adjustment gain value AG1 to the integration circuit 22.

Thereafter, the integration circuit 22 multiplies the adjustment gain value AG1 by the charge/discharge command signal SCS to generate an adjustment amount signal AA corresponding to the adjustment amount of the charge/discharge command signal SCS, and outputs the adjustment amount signal AA to the limit circuit 23.

The limit circuit 23 limits the adjustment amount signal AA1 such that the absolute value of the adjustment amount indicated by the adjustment amount signal AA1 does not become too large, that is, such that the discharge power or charge power of the second power storage device 12 falls within a predetermined range for the charge/discharge rating of the second power storage device 12. The limit circuit 23 outputs the adjustment amount signal AA1 as the second charge/discharge control signal SC2 to the second power storage device 12 and the addition circuit 24.

As a result, also according to the third embodiment, in the same manner as the case of the second embodiment, the conditions under which charging and discharging by the second power storage device 12 is required can be relaxed, the rated charge/discharge capacity of the second power storage device 12 can be set to the minimum required, and the charge/discharge input/output rating can be further reduced.

Thereafter, the addition circuit 24 subtracts the second charge/discharge control signal SC2 from the charge/discharge command signal SCS and outputs it as the first charge/discharge control signal SC01 to the second limit circuit 32 and the second addition circuit 33.

The second limit circuit 32 limits the first charge/discharge control signal SC01 such that the absolute value of the adjustment amount indicated by the first charge/discharge control signal SC01 does not become too large, that is, such that the discharge or charge power of the first power storage device 11 falls within a predetermined range for the charge/discharge rating of the first power storage device 11. The second limit circuit 32 outputs the signal as the first charge/discharge control signal SC1 to the first power storage device 11.

Meanwhile, the second addition circuit 33 calculates a difference between the first charge/discharge control signal SC1 and the first charge/discharge control signal SC0, and outputs a difference signal SCD to the third addition circuit 34.

As a result, the third addition circuit 34 receives the second charge/discharge control signal SC02 identical to the second charge/discharge control signal SC2 according to the embodiment, calculates a difference between the second charge/discharge control signal SC02 and the difference signal SCD, and outputs it as the second charge/discharge control signal SC2 to the second power storage device 12.

The first power storage device 11 charges or discharges on the basis of the first charge/discharge control signal SC1, and the second power storage device 12 charges or discharges on the basis of the second charge/discharge control signal SC2, with the first power storage device 11 used as the charge/discharge target.

As a result, according to the third embodiment, in addition to the effects of the second embodiment, the charge and discharge power of the second power storage device 12 is limited within the limit range defined by the limit circuit 23, while maintaining the charging rate of the first power storage device 11 around the predetermined charging rate range.

Furthermore, when there is room in the charge/discharge power corresponding to the charge/discharge command signal SCS by the host control system 19, the second power storage device 12 can control the charge/discharge power of the first power storage device 11 to the maximum charge/discharge power of the first power storage device 11. With this structure, the load on the first power storage device 11 can be maintained within the optimal range, and the charging rate can be maintained in a more optimal state.

Although some embodiments of the present invention have been described, these embodiments are presented as examples and are not intended to limit the scope of the invention. These novel embodiments can be implemented in various other forms, and various omissions, substitutions, and changes can be made within a range not departing from the gist of the invention. These embodiments and modifications thereof are included in the scope and the gist of the invention, and the inventions in the claims and their equivalents.

The invention claimed is:

1. An energy storage system that includes first and second power storage devices and a control system, and is configured to perform charge/discharge control for the first power storage device and the second power storage device based on a charge/discharge command value, the first power storage device being configured to perform discharging for one or more devices serving as a power supply destination via a power line or perform charging of power supplied from one or more devices serving as a power supply source via the power line, and the second power storage device being connected to the first power storage device via the power line and configured to perform charging and discharging for the first power storage device, the first power storage device outputting a charging rate signal corresponding to a charging rate of the first power storage device, and the control system being configured to:

limit charge/discharge power for the first power storage device by the second power storage device to fall within a predetermined limit range, and control charge/discharge power for the first power storage device by the second power storage device based on the charging rate signal so that a power storage rate of the first power storage device remains within a predetermined power storage rate range while continuing charging and discharging based on the charge/discharge command value by the first power storage device; and control charge/discharge power of the first power storage device based on charge/discharge power corresponding to the charge/discharge command value.

2. The energy storage system according to claim 1, wherein the control system is configured to stop charging and discharging of the second power storage device when the power storage rate of the first power storage device falls within the predetermined power storage rate range.

3. The energy storage system according to claim 1, wherein the control system is configured to control the charge/discharge power of the second power storage device to limit the charge/discharge power of the first power storage device to predetermined maximum charge/discharge power of the first power storage device when a sun of the charge/discharge power corresponding to the charge/discharge command value and the charge/discharge power of the second power storage device exceeds the maximum charge/discharge power.

4. The energy storage system according to claim 1, wherein the first power storage device is capable of charging and discharging during a first period, and the second power storage device is capable of charging and discharging during a period longer than the first period.

5. A control method performed in an energy storage system that includes a first power storage device and a second power storage device and is configured to perform charge/discharge control for the first power storage device and the second power storage device based on a charge/discharge command value, the first power storage device being configured to perform discharging for one or more devices serving as a power supply destination via a power line or perform charging of power supplied from one or more devices serving as a power supply source via the power line, and the second power storage device being connected to the first power storage device via the power line and configured to perform charging and discharging for the first power storage device, the method comprising:

detecting a charging rate of the first power storage device;

limiting charge/discharge power for the first power storage device by the second power storage device to fall within a predetermined limit range;

controlling charge/discharge power for the first power storage device by the second power storage device based on the detected charging rate of the first power storage device so that a power storage rate of the first power storage device remains within a predetermined power storage rate range while continuing charging and discharging based on the charge/discharge command value; and controlling charge/discharge power of the first power storage device based on charge/discharge power corresponding to the charge/discharge command value.

* * * * *

UNITED STATES PATENT AND TRADEMARK OFFICE
CERTIFICATE OF CORRECTION

Page 1 of 1

PATENT NO. : 12,126,174 B2
APPLICATION NO. : 17/769319
DATED : October 22, 2024
INVENTOR(S) : Monden et al.

It is certified that error appears in the above-identified patent and that said Letters Patent is hereby corrected as shown below:

In the Claims

• Claim 3, Column 9, Line 21, "a sun" should read --a sum--.

Signed and Sealed this
Sixteenth Day of September, 2025

Coke Morgan Stewart
*Acting Director of the United States Patent and Trademark Office*